US005362510A

United States Patent [19]
Mizoguchi et al.

[11] Patent Number: 5,362,510
[45] Date of Patent: Nov. 8, 1994

[54] PROCESSED STARCH AND BAKERY FOODS UTILIZING SAME

[75] Inventors: Naoyuki Mizoguchi, Itami; Yoshifumi Yanetani, Nara; Naoko Yamashita, Osaka, all of Japan

[73] Assignee: Matsutani Chemical Industries Co., Ltd., Hyogo, Japan

[21] Appl. No.: 906,710

[22] Filed: Jun. 30, 1992

[30] Foreign Application Priority Data

Jul. 3, 1991 [JP] Japan .................. 3-190656

[51] Int. Cl.$^5$ .............................................. A21D 2/18
[52] U.S. Cl. .................................. 426/549; 426/578
[58] Field of Search ................................ 426/578, 549

[56] References Cited

U.S. PATENT DOCUMENTS

| | | | |
|---|---|---|---|
| 3,904,429 | 9/1975 | Eastman et al. | 426/242 |
| 3,949,104 | 4/1976 | Cheng et al. | 426/578 |
| 4,183,969 | 1/1980 | Rubens | 426/578 |
| 4,219,646 | 8/1980 | Rubens | 426/661 |
| 4,281,111 | 7/1981 | Hunt et al. | 426/578 |
| 4,465,702 | 8/1984 | Eastman | 426/578 |
| 4,634,596 | 1/1987 | Eastman | 426/578 |
| 4,636,397 | 1/1987 | Brown et al. | 426/578 |
| 4,885,180 | 12/1989 | Cochran et al. | 426/549 |
| 4,973,447 | 11/1990 | Seib et al. | 426/549 |

FOREIGN PATENT DOCUMENTS

| | | |
|---|---|---|
| 0305105 | 3/1989 | European Pat. Off. . |
| 5921335 | 2/1964 | Japan . |
| 61-36898 | 8/1986 | Japan . |
| 62-11076 | 1/1987 | Japan . |
| 63-3572 | 1/1988 | Japan . |
| 387135 | 4/1991 | Japan . |
| 491744 | 3/1992 | Japan . |
| 2078767 | 1/1982 | United Kingdom . |

OTHER PUBLICATIONS

Patent Abstracts of Japan vol. 16, No. 320 Jul. 14, 1992.
Abstract of JPA 04 091 744 Mar. 25, 1992.
"Food Chemistry", Second Edition, Revised and Expanded, Edited by Owen R. Fennema, Department of Food Science, University of Wisconsin-Madison, Madison, Wisconsin, 1985, pp. 118–120.

Primary Examiner—Donald E. Czaja
Assistant Examiner—Mary S. Mims
Attorney, Agent, or Firm—Sughrue, Mion, Zinn, Macpeak & Seas

[57] ABSTRACT

A processed starch which is up to 8% in solubility on heating, is in the form of particles including up to 5% of +60-mesh fraction and has a cold water swelling power (Sc) and a heating swelling power (Sh) which are in the relationship of $1.2 \geq Sc/Sh \geq 0.8$, the cold water swelling degree being 4 to 15. The starch is useful as an ingredient for bakery foods to give an excellent texture to the food and inhibit degradation of the food with time.

7 Claims, No Drawings

PROCESSED STARCH AND BAKERY FOODS UTILIZING SAME

BACKGROUND OF THE INVENTION

1. Field of the Invention

The present invention relates to processed starches for use in bakery foods to impart improved moldability to the dough and achieve outstanding effects in giving an improved texture to the food and ameliorating the deterioration of the food with time. The invention relates also to bakery foods utilizing the processed starch.

2. Description of the Prior Art

Foods available in recent years have generally become softer, and it is desired that bakery foods also have a soft or tender texture. Bakery foods undergo deterioration, usually becoming harder with lapse of time after baking and tasting undesirable due to a crumbly texture. The deterioration is thought attributable chiefly to the retrogradation of starch. This drawback is precluded to some extent with use of sugars, emulsifiers, thickeners, etc., but the result achieved still remains unsatisfactory.

To give a soft texture to bread or impart a tender agreeable texture to sponge cake and the like, emulsifiers such as glycerin fatty acid esters, propylene glycol fatty acid esters or sucrose fatty acid esters are used, whereas these emulsifiers have the problem that when used in an amount sufficient to achieve the desired effect, the emulsifier impairs the flavor and taste of the food. Although fats and oils in the form of an emulsion, such as condensed milk, are also used, they have difficulty in giving a constant quality to end products unless they are used in greatly limited conditions.

As a method of imparting an improved texture to bakery foods with use of starches, we have already applied a patent to substitute gluten and a processed starch which does not swell in cold water for a portion of wheat flour to obtain bread of soft texture (unexamined Japanese Patent Publication 87135-1991). However, this method has the drawback that the amount of substitution is as great as 10 to 20 wt % to result in an increased cost. Although cooked-up starch solutions are also used, they have the drawback of encountering difficulty in obtaining a end product of specified quality unless the starch is gelatinized under strict control. Such starches have another drawback in that if used in an amount sufficient to obtain the desired effect, the starch produces larger voids in the resulting crumb of bread. It has also been applied a patent to use pregelatinized starch which is prepared from untreated wheat flour, corn starch or potato starch (unexamined Japanese Patent Publication 175845-1984). Nevertheless, use of the pregelatinized starch is liable to make the dough sticky during processing, render the dough difficult to handle and afford bread which tends to be sticky and have a poor mouthfeel.

We have previously disclosed a process for preparing bread incorporating crosslinked pregelatinized starch which is 4.0 to 35 in cold water swelling power, having a soft texture and less susceptible to staling with time (Japanese Patent Application 209731-1990). This process produces a remarkable effect as contemplated but still has the problem of caving, i.e., shrinkage of baked bread which occurs on cooling, especially caving of the sides of loaves of bread.

Other modified starches are also proposed which are limited in swelling volume or swelling power. Unexamined Japanese Patent Publications 5700-1982 and 148554-1988 disclose a modified starch having a swelling volume of about 3 to 15 ml/g and a modified starch having a swelling power of 3.0 to 6.0, respectively. However, the swelling volume or power is a value determined at room temperature and does not involve the concept of swelling that occurs during heating in food production processes. The volume or degree of swelling resulting from actual heating is several times as great as the corresponding value at room temperature. These proposals are therefore different from the present invention in the concept of swelling and fail to produce the effect contemplated by the present invention.

SUMMARY OF THE INVENTION

The main object of the present invention is to provide a novel processed starch for use in bakery foods for giving an improved and soft or tender texture to the bakery food and increasing the shelf-life of the food without adversely affecting the taste, texture, and shape of the food in any way, and to provide a bakery food which is given these outstanding characteristics by the processed starch incorporated therein.

The above object is fulfilled by a processed starch up to 8% in hot water solubility, in the form of particles with less than 5% remains on 60 mesh sieve and having a cold water swelling power (Sc) and a hot water swelling power (Sh) which are in the relationship of $1.2 \geq Sc/Sh \geq 0.8$, the cold water swelling power being 4 to 15, and by incorporating the processed starch into the dough to be made into a bakery food.

DETAILED DESCRIPTION OF THE INVENTION

The term "bakery foods" as used herein refers to foods which are prepared from dough, i.e., a mixture of wheat flour and other ingredients, by baking or steaming the dough or frying the dough in oil or fat. More specifically stated, the dough comprises wheat flour serving as the main material, other grain flours, such as rye flour, corn flour, graham flour and rice flour, which may be used as required, essential ingredients including water, common salt and gas bubble forming material, and secondary materials required for preparing the desired food. The food is obtained by cooking the dough with heating to a water content of about 15 to about 45%, with gas incorporated into the dough to some extent due to the presence of yeast, baking powder, whole eggs, egg white or the like, before or during heating. Examples of bakery foods are those obtained by baking in ovens and including pullman, English bread, one loaf and like white bread, buguette, Parisian and like French bread, sweet roll, buns, table roll and like rolls, English muffins, pizzas, sponge cake, poundcake and like cakes; doughnuts and fritters which are fried in oil; steamed cakes and Chinese dumpling which are steamed; pancake and griddle cake which are griddled; etc. Examples of useful secondary materials are those generally used in bakery foods and include sugars, milk products, fats and oils, emulsifiers, flavorings, seasonings, artificial sweeteners, colorants, liquors, nuts, cocoa powder, etc. The present invention is applicable also to refrigerated or frozen dough which is utilized in recent years for the rationalization of bakery food production processes or because of reasons involved in distribution.

The present invention provides a processed starch characterized in that the starch is up to 8% in hot water solubility, is in the form of particles with less than 5% remains on 60 mesh sieve and has a cold water swelling power (Sc) and a hot water swelling power (Sh) which are in the relationship $1.2 \geq Sc/Sh \geq 0.8$, the cold water swelling power being 4 to 15, and further provides bakery foods having the processed starch incorporated therein. The use of the processed starch of the invention specifically affords bakery foods which have an improved texture and longer shelf-life.

The processed starch of the invention is in the form of particles up to 5% of which remain on a 60-mesh sieve when screened therewith, and is up to 8%, preferably up to 6%, in hot water solubility. If the amount of 5% remains on 60 mesh sieve, the food obtained and incorporating the starch feels less smooth and is not desirable. When starch is heated in the presence of a large amount of water, the granules of starch collapse, usually forming a gelatinized liquid which is a mixture of a dissolved portion, swollen granules and fragments of them. The solubility at this time, although different from starch to starch, generally increases with a rise in the temperature and with an increase in heating time, and is usually at least 20 to 25%. The processed starch of the invention is provided as preheated in the presence of water, and the solubility thereof as defined herein is a value obtained when the starch is further heated. It is to be noted that the value thus obtained is up to 8%, preferably up to 6%.

The processed starch of the present invention has a cold water swelling power of 4 to 15, preferably 6 to 12, and the ratio of this cold water swelling power (Sc) to the hot water swelling power (Sh) thereof is in the range of $1.2 \geq Sc/Sh \geq 0.8$. If the cold water swelling power is smaller than 4, the dough obtained is poor in moldability. When this degree is greater than 1.5, and also when the Sc/Sh ratio is outside the range of 1.2 to 0.8, the starch fails to give the desired effect fully to the food.

As previously described, the modified starch which is limited in cold water swelling power is already known. It is also practice to recognize some of the properties of starches which will not swell in cold water, by measuring the swelling power of the starch in hot water. However, processed starches are not known which are defined in terms the concept of variation in the swelling power in cold water and in hot water of cold water swelling starches, nor it is known to define such a processed starch by limiting this property based on the same concept. The present starch, which is specifically limited based on this concept, makes it possible to provide bakery foods which are excellent both in texture and in quality.

The particle size, cold water swelling power, hot water swelling power, etc. are determined by the following methods of analysis.

Particle Size

A sample is dispersed in water to a concentration of 5%, and the dispersion is allowed to stand at 25° C. for 30 minutes and thereafter screened with a 60-mesh test sieve. The ratio of the amount of particles remaining on the sieve to the whole amount of the sample in dry weight is expressed in percentage as the amount of remains on 60 mesh sieve.

Cold Water Swelling Power

About 1 g of a dry sample is dispersed in 100 ml of water at 25° C., and the dispersion is gently stirred in a water bath at 25° C. for 30 minutes and then centrifuged (at 3000 r.p.m. for 10 minutes) to separate the dispersion into a gel layer and a supernatant layer. The weight of the gel layer is then measured and taken as A. The gel layer is thereafter dried to a solid state (of constant weight at 105° C.), and the weight of the resulting solid is measured and taken as B. The swelling power is expressed by A/B.

Hot Water Swelling Power, Hot Water Solubility

A 1.0 g quantity of a dry sample is dispersed in 100 ml of water, and the dispersion is heated at 90° C. for 30 minutes, immediately followed by centrifuging (at 3000 r.p.m. for 10 minutes) to separate the dispersion into a gel layer and a supernatant layer. The weight of the gel layer is then measured and taken as C. The gel layer is thereafter dried to a solid state (of constant weight at 105° C.), and the weight of the resulting solid is measured and taken as D. The heating swelling power is expressed by C/D. On the other hand, the volume of the supernatant is measured, and the total amount of saccharides contained in the supernatant is determined by the phenol-sulfuric acid method to calculate the solubility on heating.

A preferred process for preparing the processed starch of the present invention will be described below although this process is not limitative. Any process is usable insofar as the processed starch obtained has the foregoing characteristics.

Examples of starting materials for use in the invention are natural starches such as potato starch, sweet potato starch, tapioca starch, corn starch, waxy corn starch, high-amylose corn starch, sago starch, wheat starch, rice starch and bean starches, and these starches as bleached. One or more than two of these starches are usable. Preferred starches are potato starch, sweet potato starch and sago starch, among which potato starch is most preferable. The reason is that these starches readily afford the processed starch of the invention and that the processed starch prepared from a starch other than these needs to be used in a somewhat increased amount to obtain the same result in preparing some foods.

Starches may be bleached in the conventional process. Examples of useful bleaching agents are those generally used, such as sodium hypochlorite, hydrogen peroxide, peracetic acid, sodium chlorite, sulfur dioxide, sulfites, potassium permanganate and ammonium persulfate. For example when sodium hypochlorite is used, the bleaching treatment is conducted in the usual manner using this agent in an amount of about 500 to about 2000 ppm calculated as available chlorine.

The starch to be used as the starting material is crosslinked first. The crosslinked starch may be obtained by causing a crosslinking agent only to act on the material, whereas it is preferable to esterify or etherify, and crosslink the material to obtain a crosslinked starch ester or ether. More preferably, the crosslinked starch ester is a crosslinked acetyl starch, and the crosslinked starch ether is a crosslinked hydroxypropyl starch.

Such a crosslinked starch is prepared by reacting a crosslinking agent only with starch in the conventional process, or by reacting a crosslinking agent, and an esterifying agent or etherifying agent therewith. Examples of useful crosslinking agents are metaphosphates, phosphorus oxychloride, epichlorohydrin, acrolein and the like.

Examples of esterifying agents useful for preparing crosslinked starch esters are acetic anhydride, vinyl acetate monomer, orthophosphates, sodium tripolyphosphate, succinic anhydride and the like, among which acetic anhydride and vinyl acetate monomer are preferable.

Examples of etherifying agents useful for preparing crosslinked starch ethers are propylene oxide, sodium monochloroacetate and the like, among which propylene oxide is preferable.

The esterification degree and etherification degree of the crosslinked starch ester and crosslinked starch ether are 0.01 to 0.25 in terms of DS (abbreviation for Degree of Substitution indicating the number of substituents per unhydroglucose unit of the starch). If the degree is less than 0.01, the effect of etherification or esterification is insufficient, whereas degrees in excess of 0.25 produce no change in the contemplated effect, make it more difficult to handle the aqueous system used with a decrease in gelatinization temperature and are therefore uneconomical. The conversion of the starting material to the crosslinked starch ester or ether permits use of a wider range of conditions for preparing the processed starch of the invention and is accordingly preferable.

On the other hand, the crosslinking degree of the crosslinked starch is such that when an aqueous dispersion of the starch is heated to 90° C., then cooled to 50° C. and checked for viscosity by a Brookfield viscometer, the dispersion exhibits a viscosity of about 500 cP at a concentration of about 10 to about 17%.

While it is known that the swelling power of crosslinked starch is variable by degree crosslinking, it is difficult to obtain the processed starch of the invention which is limited in the ratio of cold water swelling power to hot water swelling power by adjusting the crosslinking degree only. It is therefore necessary to subsequently subject the crosslinked starch to a heat treatment in a specified temperature range in addition to the adjustment of the crosslinking degree.

The crosslinked starch thus obtained is made into about 10 to 40 wt % aqueous slurry, which is then heated to fully swell the granules of starch to a stabilized state, i.e., until the viscosity of the slurry almost ceases rising despite continued heating.

Although starches generally swell and become viscous when heated in the presence of water, further continued heating results in a reduced viscosity owing to collapsing of starch granules or dissolving out of starch molecules. In the case of crosslinked starches, it has been recognized that the starch granules are inhibited from swelling or collapsing, such that the starch granules swell slowly when heated, and swell in different modes at different temperatures. However, when the processed starch having the preferred crosslinking degree mentioned is heated at a temperature in the range of from a temperature about 27° C. higher than the swelling starting temperature as determined by a Branbender amylograph to about 130° C., a processed starch having a stabilized swelling power independently of the temperature is obtained when that temperature is reached.

The starch to be heat-treated may be heated at a temperature which is basically not lower than the swelling starting temperature, but the starch slowly swells at a temperature in the range of from the swelling starting temperature to the temperature about 27° C. higher than the swelling starting temperature and therefore takes much time to reach the stabilized state when heated in this range. Further it is then necessary to check the starch for the swollen state from time to time to determine the end point, hence a cumbersome procedure. Although the starch can be heated at a temperature above about 130° C., the starch is then susceptible to the influence of a mechanical shearing force. For example, this necessitates a gradual pressure reduction when an increased pressure applied to the starch is to be decreased to atmospheric pressure. Thus, the heat treatment is not practically advantageous if conducted at temperatures outside the first-mentioned specified range.

The device to be used for heating is one which is usually used for cooking starches, such as open cooking equipments, votator or jet cooker. A drum dryer for heating and drying is also usable when a dry product is to be obtained. In the case where the starch is liable to a mechanical shearing force during heating, care is preferably taken to avoid this, for example, by reducing the concentration of the slurry.

Incidentally, the crosslinking degree and the heating condition described hereinabove are applicable in the preferred mode of practicing the present invention, that is, when the processed starch is prepared from potato starch, sweet potato starch or sago starch. These conditions are not always sufficient for the process starch of the invention to fulfill the specified requirements when it is prepared from other starch material. It is then necessary to further determine suitable conditions. For example in the case where waxy corn starch is used, the swelling power ratio tends to be greater relative to the cold water swelling ratio, so that the foregoing crosslinking degree should be somewhat lower.

The starch thus swollen by heating may be immediately cooled to obtain a paste as a commercial product, or can be frozen for distribution. Alternatively, the starch can be dried into a powder as by drum drying, spray drying or freeze drying. The product is prepared in a suitable form which is determined in view of use, distribution or storage.

While the processed starch of the present invention is prepared by the process described hereinabove, food ingredients or additives which are generally used for foods can be suitably added to the processed starch as required to obtain a product. Examples of suitable additives are gluten, soybean protein, egg white and other proteins, vegetable fats and oils, animal fats and oils, glucose, maltose, sorbitol, sugar, oligosaccharides, starch hydrolyzate, hydrogenated starch hydrolyzate and like saccharides, salt, emulsifiers, seasonings, pH adjusting agents, phosphates, etc.

In preparing bakery foods, the processed starch obtained is used in an amount of 0.5 to 15 parts by weight calculated as solids per 100 parts by weight of the grain flour material used for the food. The starch imparts excellent moldability to the dough even if the dough contains a large amount of water, giving various characteristics to the resulting food.

There are a wide variety of bakery foods which are produced by various processes. The present invention can also be practiced basically by the same production steps and production conditions as generally employed. The object of the invention can be achieved by adding 0.5 to 15 wt % of the processed starch of the invention, calculated as solids, to the grain flour material during mixing, whipping or kneading in the dough preparing step included in the conventional series of production steps. Since the processed starch of the invention has higher water binding property than wheat flour, it is necessary to add water in an amount about 2 to about 25% larger than is used conventionally to obtain dough in a desirable state. Generally, the moldability of dough reduces with an increase in the amount of water added to result in a lower working efficiency, whereas the present invention can be practiced free of such trouble and is favorable for improving the yield of dough.

Although use of an increased amount of water in conventional production processes is liable to entail the problem of caving in bread or deformation of cakes, the bakery foods having the processed starch of the present invention incorporated therein are free of such problems, have a soft or tender and agreeable texture and are ameliorated in respect of deterioration with time.

Various materials are generally used in bakery foods for various purposes in addition to essential ingredients such as salt, yeast, yeast food, sugar, oils, fats, eggs and skim milk powder. Examples of such materials are whole milk, condensed milk, cheese and other milk products, glucose, sorbitol, glucose syrup, high fructose corn syrup, oligosaccharides, hydrogenated starch hydrolyzate, maltodextrin and like saccharides or dextrins, glycerin fatty acid esters, sucrose fatty acid esters, lecithin and other emulsifiers, gluten, soybean protein, egg yolk, egg white and other proteins, gellan gum, carrageenan, sodium alginate, corn starch and like polysaccharides, protease, amylase and like enzymes, raisin and like dried fruits, liquors, seasonings, artificial sweeteners, colorants, flavorings, nuts, cocoa powder, preservatives, etc. These materials are usable as required also in the present invention.

The present invention will be described with reference to the following examples and comparative examples, in which the parts are by weight.

EXAMPLE 1

In 120 parts of water was dissolved 20 parts of sodium sulfate, and 100 parts of commercial potato starch was added to the solution to obtain a slurry. 4 separate slurries were prepared in the same manner. To each slurry were added with stirring 30 parts of 4% aqueous solution of sodium hydroxide, 4 parts of propylene oxide, and 0.14 part, 0.2 part, 0.4 part of 0.8 part of epichlorohydrin, followed by reaction at 41° C. for 20 hours, neutralized with sulfuric acid and washed with water. The slurries obtained were about 10%, 12%, 15% or 16.5% respectively in concentration when exhibiting a viscosity of about 500 cP, and were about 53° C. in swelling starting temperature. Each of the slurries was then made into a 25% aqueous slurry and heat-treated in a double drum dryer having a surface temperature of 150° C. to obtain a dry product. The heat treatment temperature at this time was 102° C. The dry product was subsequently crushed and screened with a 60-mesh sieve. In this way, crosslinked etherified processed starches, i.e., samples No. 1 to No. 4, were obtained. Table 1 shows properties of the samples. The samples were in the range of 0.08 to 0.085 in etherification degree (DS).

COMPARATIVE EXAMPLE 1

Sample No. 5 was prepared in the same manner as in Example 1 with the exception of using 0.1 part of epichlorohydrin. The slurry was about 8.5% in concentration when exhibiting a viscosity of about 500 cP before heat treatment. The swelling starting temperature was the same as in Example 1.

COMPARATIVE EXAMPLE 2

Sample No. 6 was prepared by the same procedure as in Comparative Example 1 with the exception of using high-amylose corn starch containing 69% of amylose as the raw material and 0.21 part of epichlorohydrin.

COMPARATIVE EXAMPLE 3

Sample No. 1 obtained in Example 1 was prepared as Sample No. 7 without screening with the 60-mesh sieve.

COMPARATIVE EXAMPLE 4

Sample No. 8 was prepared by the same procedure as in Comparative Example 1 with the exception of changing the raw material to tapioca starch and using 8.5 parts of propylene oxide and 0.45 part of epichlorohydrin.

COMPARATIVE EXAMPLE 5

Sample No. 9 was prepared by the same procedure as in Comparative Example 1 with the exception using 13.5 parts of propylene oxide and 0.2 part of epichlorohydrin. The sample was about 9% in concentration when exhibiting a viscosity of about 500 cP before heat treatment. The swelling starting temperature was about 44° C.

COMPARATIVE EXAMPLE 6

The same procedure as used for preparing sample No. 2 in Example 1 was partly repeated to obtain a reaction mixture as washed with water, followed by the heat treatment to be described below. The washed mixture was made into a 15% aqueous slurry, which was then heated at 64° C. for 15 minutes and thereafter spray-dried at an inlet air temperature of 175° C. and an outlet air temperature of 85° C. to obtain sample No.10.

COMPARATIVE EXAMPLE 7

Sample No. 11 was prepared by the same procedure as in Comparative Example 4 with the exception of changing the material starch to waxy corn starch and using 0.15 part of epichlorohydrin.

TABLE 1

| Sample No. | Particle size (%) | Hot water solubility (%) | Cold water swelling power | Swelling power ratio |
| --- | --- | --- | --- | --- |
| 1 | 3.4 | 7.4 | 14.1 | 1.12 |
| 2 | 0.8 | 5.3 | 11.1 | 1.04 |
| 3 | 0.5 | 2.5 | 8.5 | 1.02 |
| 4 | 0.1 | 0.8 | 5.3 | 0.84 |
| 5 | 5.5 | 9.0 | 16.4 | 1.23 |
| 6 | 0.1 | 10.4 | 6.3 | 0.85 |
| 7 | 6.5 | 7.1 | 14.3 | 1.11 |
| 8 | 0.3 | 1.7 | 3.6 | 0.88 |
| 9 | 2.5 | 5.8 | 15.8 | 1.08 |
| 10 | 0.1 | 5.2 | 7.9 | 0.74 |
| 11 | 3.8 | 4.7 | 11.8 | 1.24 |

EXAMPLE 2

Loaves of white bread were prepared in the conventional process using samples No. 1 to No. 11 and the ingredients given below.

| Ingredients | Control | Example |
| --- | --- | --- |
| (Sponge) | | |
| Hard wheat flour | 70 parts | 70 parts |
| Dry yeast | 1 part | 1 part |

-continued

| Ingredients | Control | Example |
|---|---|---|
| Yeast food | 0.1 part | 0.1 part |
| Water | 42 parts | 42 parts |
| (Dough) | | |
| Hard wheat flour | 30 parts | 27.5 parts |
| Sample | | 2.5 parts |
| Sugar | 6 parts | 6 parts |
| Salt | 2 parts | 2 parts |
| Skim milk powder | 2 parts | 2 parts |
| Shortening | 5 parts | 5 parts |
| Water | 24 parts | 32 parts |

The bread obtained was maintained at 20° C. as placed in a closed vinyl bag and checked for softness and caving by the following methods 1 day and four days thereafter. Table 2 shows the results.

Softness

At a specified distance (3 cm) from one end of the loaf of bread, a piece of bread, 40×40×40 mm, was cut out. The compressive resistance of the piece was measured by a rheometer under the following conditions as an index of softness.

| | |
|---|---|
| Plunger: | circular, 15 mm in diameter |
| Speed of test table: | 60 mm/min. |
| Distance of movement of test table: | 20 mm |
| Sensitivity of main body: | 500 g |

Caving

The loaf of bread maintained for 1 day as stated above was cut vertically at its center portion. The length (L) of bottom side of the bread and the length (S) of the shortest portion thereof in parallel to the bottom side of the cut surface were measured. The caving is expressed in terms of S/L×100(%).

TABLE 2

| | Sample No. | Softness (g) 1 day later | Softness (g) 4 days later | Caving (%) |
|---|---|---|---|---|
| Control | — | 130 | 278 | 88.7 |
| Example | 1 | 113 | 180 | 86.0 |
| | 2 | 109 | 179 | 89.8 |
| | 3 | 108 | 175 | 90.6 |
| | 4 | 116 | 200 | 87.2 |
| Comp. Ex. | 5 | 112 | 182 | 78.5 |
| | 6 | 129 | 268 | 88.1 |
| | 7 | 118 | 191 | 86.3 |
| | 8 | 128 | 262 | 87.4 |
| | 9 | 111 | 180 | 79.0 |
| | 10 | 125 | 256 | 85.6 |
| | 11 | 121 | 259 | 81.1 |

The use of samples Nos. 1 to 4 caused no problem to the kneading step, giving bread which was agreeable and satisfactory in texture.

EXAMPLE 3

To 120 parts of water was added 100 parts of sweet potato starch to obtain a slurry. Sodium trimetaphosphate (0.25 part) was added to the slurry while maintaining the slurry at a pH of 11.3 to 11.5 with addition of 3% aqueous solution of sodium hydroxide with stirring, followed by reaction at 39° C. for 5 hours. The reaction mixture was neutralized with hydrochloric acid, washed with water and then checked for swelling starting temperature, which was found to be about 68° C. The mixture was subsequently made into a slurry having a concentration of 12%. The slurry was heated to 97° C. using a rotator and spray-dried at an inlet air temperature of 175° C. and an outlet air temperature of 85° C. to obtain a processed starch as sample No. 12. Table 3 shows the properties of the sample.

EXAMPLE 4

To 120 parts of water was added 100 parts of sago starch to obtain a slurry. Sodium trimetaphosphate (0.5 part) was added to the slurry while maintaining the slurry at a pH of 11.3 to 11.5 by adding 3% aqueous solution of sodium hydroxide with stirring, followed by reaction at 39° C. for 5 hours. The reaction mixture was then adjusted to a pH of 9.5 with sulfuric acid and cooled to 25° C. Subsequently, 6 parts of acetic anhydride was added to the cooled mixture for acetylation while maintaining the mixture at a pH of 9.0 to 9.5 by adding 3% aqueous solution of sodium hydroxide. The reaction mixture was neutralized with sulfuric acid, washed with water and thereafter spray-dried in the same manner as in Example 3 to obtain a processed starch, which was found to be 0.068 in acetylation degree (DS). Table 3 shows the properties of the starch (sample No. 13). The reaction mixture before the heat treatment was found to be about 64° C. in swelling starting temperature.

EXAMPLE 5

A processed starch, i.e., sample No. 14, was prepared in the same manner as in Example 4 with the exception of replacing sago starch by tapioca starch. Table 3 shows the properties of the sample. The reaction mixture before the heat treatment was about 59° C. in swelling starting temperature.

EXAMPLE 6

The same reaction procedure as in Example 1 was repeated with the exception of using 10 parts of propylene oxide and 1% of sodium trimetaphosphate in place of epichlorohydrin. The reaction mixture was then neutralized, washed with water and thereafter made into a 20% slurry, which was subsequently heated to about 55° C. to swell the particles to such an extent that no precipitate would occur. The slurry was filled into a tube for retorting food, autoclaved at 120° C. for 20 minutes and thereafter cooled to room temperature to obtain a processed starch in paste form. Table 3 shows the properties of the starch (sample No. 15). The slurry before the heat treatment was found to be about 49° C. in swelling starting temperature.

TABLE 3

| Sample No. | Particle size (%) | Hot water solubility (%) | Cold water swelling power | Swelling power ratio |
|---|---|---|---|---|
| 12 | 1.0 | 4.9 | 7.2 | 1.03 |
| 13 | 0.7 | 4.3 | 8.4 | 0.97 |
| 14 | 0.6 | 4.0 | 7.3 | 0.90 |
| 15 | 0.1 | 1.2 | 8.8 | 0.95 |

EXAMPLE 7

Skin portions of Chinese dumplings were prepared by the sponge and dough mixing method according to the following recipe under the conditions given below using samples Nos. 12, 13, 14 and 15 obtained in Examples 3, 4, 5 and 6. Before the preparation, the amount of each sample preferable for preparing dough was determined using a mixograph. The skin portion of each dumpling obtained was maintained at 20° C. as placed in a closed bag, a 40 mm square central portion thereof was cut out, and the compressive resistance of the cut-out piece was measured by a rheometer as an index of softness. Table 4 shows the result with the index of a control taken as 100. The amount of sample No. 9 is given as calculated as solids, and the amount of water used therewith was suitably adjusted.

| Ingredients | Control | Example |
|---|---|---|
| (Sponge) | | |
| Hard wheat flour | 70 parts | 70 parts |
| Yeast | 2.5 part | 2.5 part |
| Water | 40 parts | 40 parts |
| (Dough) | | |
| Hard wheat flour | 30 parts | 26~23 parts |
| Sample | | 4~7 parts |
| Sugar | 10 parts | 10 parts |
| Salt | 1.2 parts | 1.2 parts |
| Lard | 4 parts | 4 parts |
| Baking powder | 1 part | 1 part |
| Water | 8 parts | 21 parts |
| (Steps) | | |
| Sponge mixing: | 2 min. at low speed | |
| | 2 min. at medium speed | |
| Sponge mixing temperature: | 27° C. | |
| Sponge fermentation time: | 60 min., 27° C. | |
| Dough mixing: | 2 min. at low speed | |
| Dough mixing temperature: | 28° C. | |
| Floor time: | 10 min. | |
| Dividing: | 75 g | |
| Final proofer: | 30 min., temp. 40° C., humidity 50% | |
| Steaming: | 15 min. | |

TABLE 4

| | Processed starch | | | Softness | |
|---|---|---|---|---|---|
| | Sample No. | Material Starch | Amount used | 1 day later | 3 days later |
| Control | — | — | — | 100 | 100 |
| Example | 12 | Sweet potato | 5.5 | 77 | 73 |
| | 13 | Sago | 5.5 | 75 | 68 |
| | 14 | Tapioca | 7.0 | 80 | 72 |
| | 15 | Potato | 4.0 | 70 | 61 |

The use of the processed starches of the invention entailed no problem as to the moldability of the dough despite the presence of an increased amount of water, affording Chinese dumplings which all had a soft or tender and agreeable texture. The products were comparable to the control in volume.

EXAMPLE 8

Poundcakes were prepared in the usual manner by the sugar batter method according to the following recipe using sample No. 3, processed starch of the invention. In this preparation procedure, the ingredients (1) were mixed together and whipped, and the ingredients (2) were then added to the mixture, followed by gentle stirring to prepare a dough.

| | Example | Control |
|---|---|---|
| Ingredients (1) | | |
| Sugar | 100 parts | 100 parts |
| Liquid shortening | 50 parts | 50 parts |
| Margarine | 60 parts | 60 parts |
| Whole eggs | 120 parts | 120 parts |
| Salt | 0.5 part | 0.5 part |
| Sample No. 3 | 5 parts | |
| Water | 15 parts | |
| Ingredients (2) | | |
| Soft wheat flour | 100 parts | 100 parts |
| Skim milk powder | 5 parts | 5 parts |
| Baking powder | 1.5 parts | 1.5 parts |

The poundcakes of the invention were finer, and softer or tenderer in texture and less susceptible to degradation with time than those of the control. They appeared excellent and free of deformation or shrinkage.

EXAMPLE 9

Yeast doughnuts were prepared in the usual manner according to the following recipe using sample No. 2, processed starch of the invention. After 30 minutes of floor time and 15 minutes of bench time during the preparation, the dough was spread out to a thickness of 10 mm and blanked out with a die into doughnut pieces each weighing about 30 g. Final proof then followed for 30 minutes, whereupon the dough was fried in oil at 180° C. for 2 minutes and 15 seconds.

| Ingredients | Example | Control |
|---|---|---|
| Hard wheat flour | 70 parts | 70 parts |
| Soft wheat flour | 30 parts | 30 parts |
| Sample No. 2 | 2 parts | |
| Sugar | 12 parts | 12 parts |
| Salt | 1.5 parts | 1.5 parts |
| Baking powder | 1 part | 1 part |
| Skim milk powder | 2 parts | 2 parts |
| Whole eggs | 10 parts | 10 parts |
| Yeast | 5 parts | 5 parts |
| Shortening | 10 parts | 10 parts |
| Water | 52 parts | 48 parts |

The yeast doughnuts of the invention had a softer and more agreeable texture than those of the control, were less susceptible to degradation in this texture and had an excellent quality.

EXAMPLE 10

Pancakes were prepared by the usual method according to the following recipe using sample No. 3, processed starch of the invention. Each dough piece was griddled at 180° C. for 3 minutes over the front surface and for 1 minute over the rear side using a smooth-surfaced iron plate.

The pancakes of the invention obtained had a softer, more agreeable and smoother texture and were less susceptible to deterioration in this texture than those of the control, and therefore had an excellent quality.

| Ingredients | Example | Control |
|---|---|---|
| Soft wheat flour | 100 parts | 100 parts |
| Sugar | 30 parts | 30 parts |
| Baking powder | 3 parts | 3 parts |
| Salt | 0.5 part | 0.5 part |
| Sample No. 3 | 10 parts | |
| Whole eggs | 30 parts | 30 parts |

| Ingredients | | |
|---|---|---|
| | Example | Control |
| Water | 100 parts | 60 parts |

What is claimed is:

1. A processed starch characterized by:
   (i) a hot water solubility of not more than 8%,
   (ii) the starch being in the form of particles,
   (iii) less than 5% of the particles remain on a 60 mesh sieve,
   (iv) a ratio of a cold water swelling power (Sc) to a hot water swelling power (Sh) of from 1.2 to 0.8 and,
   (v) the cold water swelling power being from 4 to 15.

2. A processed starch as defined in claim 1, wherein the hot water solubility is not more than 6% and the cold water swelling power is 6 to 12.

3. A processed starch as defined in claims 1 or 2, which is prepared from at least one starch selected from among potato starch, sweet potato starch and sago starch.

4. A processed starch as defined in claims 1 or 2, which is prepared from potato starch.

5. A bakery food containing a processed starch, the processed starch being characterized by:
   (i) a hot water solubility of not more than 8%,
   (ii) the starch being in the form of particles,
   (iii) less than 5% of the particles remain on a 60 mesh sieve,
   (iv) a ratio of a cold water swelling power (Sc) to a hot water swelling power (Sh) of from 1.2 to 0.8 and,
   (v) the cold water swelling power being from 4 to 15.

6. A bakery food as defined in claim 5, wherein the processed starch has a hot water solubility of up to 6% and a cold water swelling power of 6 to 12.

7. A bakery food as defined in claims 5 or 6, wherein the processed starch is prepared from at least one of potato starch, sweet potato starch and sago starch.

* * * * *